(12) United States Patent  (10) Patent No.: US 6,557,373 B1
Nitta                     (45) Date of Patent:    May 6, 2003

(54) APPARATUS FOR COUPLING A MANIFOLD BLOCK TO A CONDENSER MANIFOLD

(75) Inventor: Minoru Nitta, Upland, CA (US)

(73) Assignee: Newfield Technology Corporation, Upland, CA (US)

( * ) Notice: Subject to any disclaimer, the term of this patent is extended or adjusted under 35 U.S.C. 154(b) by 0 days.

(21) Appl. No.: 10/095,732

(22) Filed: Mar. 12, 2002

(51) Int. Cl.[7] .............. F25B 1/00; F25B 39/04; B21D 54/38; B23K 31/00; F28D 7/06

(52) U.S. Cl. .............. 62/509; 62/498; 29/890.052; 29/890.054; 165/79; 165/150; 165/176; 165/178

(58) Field of Search .............. 62/509; 29/890.052, 29/890.054; 165/79, 150, 176, 178

(56) References Cited

U.S. PATENT DOCUMENTS

| | | | | |
|---|---|---|---|---|
| 4,589,265 A | * | 5/1986 | Nozawa | 62/526 |
| 4,770,240 A | | 9/1988 | Dawson et al. | |
| 5,090,477 A | | 2/1992 | Sprow et al. | |
| 5,209,290 A | * | 5/1993 | Chigira | 165/149 |
| 5,224,358 A | * | 7/1993 | Yamanaka et al. | 62/509 |
| 5,379,833 A | * | 1/1995 | Mathews | 165/113 |
| 5,415,014 A | * | 5/1995 | Waldschmidt et al. | 62/509 |
| 5,685,364 A | * | 11/1997 | Harris | 165/67 |
| 5,896,754 A | * | 4/1999 | Balthazard et al. | 62/507 |
| 5,974,828 A | * | 11/1999 | Guerand | 62/509 |
| 6,154,960 A | * | 12/2000 | Baldantoni et al. | 29/890.054 |
| 6,209,349 B1 | * | 4/2001 | Hu et al. | 62/509 |
| 6,216,777 B1 | | 4/2001 | Rhodes et al. | |
| 6,470,704 B2 | * | 10/2002 | Shibata et al. | 62/509 |

* cited by examiner

*Primary Examiner*—Denise L. Esquivel
*Assistant Examiner*—Filip Zec
(74) *Attorney, Agent, or Firm*—Pillsbury Winthrop LLP

(57) ABSTRACT

An automobile climate control system having a liquid dispersing device to allow coolant to flow. The system also utilizes a heat exchanger to cool the liquid. A manifold block handles the transfer of coolant between the coolant dispersing device and the heat exchanger. The manifold block is in communication with the heat exchanger and the coolant dispersing device; and at least one clasp connects the manifold block to the heat exchanger. A fitting clasp made from the clad material couples the heat exchanger to the at least one clasp.

20 Claims, 6 Drawing Sheets

APPARATUS FOR COUPLING A MANIFOLD BLOCK TO A CONDENSER MANIFOLD

BACKGROUND OF THE INVENTION

1. Field of the Invention

The present invention relates generally to the art of automobile climate control systems, and more particularly, to a system, method, and apparatus for connecting the climate control system to a condenser by coupling a manifold block to a condenser manifold.

2. Discussion of the Related Art

Automotive climate control systems are well known in the art. Automobiles typically utilize climate control systems to absorb and dissipate heat from inside the passenger cabin to the outside of the car. In such systems, a manifold block connects the condenser manifold to both the compressor and the expansion valve. The manifold block connects the compressor to the condenser and the condenser to the evaporator, so that refrigerant can flow between them. Refrigerant at high temperature and high pressure in vapor form flows through the pipes from the compressor to the condenser, via the condenser manifold. In the condenser, the high temperature and high pressure refrigerant in vapor form is condensed to form refrigerant in high temperature high pressure liquid form. Then, the liquid is passed through an expansion valve. The valve restricts the flow of the refrigerant, lowering the pressure of the liquid forming low pressure, low temperature liquid. This liquid is then passed through an evaporator, where heat from the passenger cabin is absorbed as the refrigerant liquid evaporates. The resulting low pressure, low temperature refrigerant liquid is connected to the compressor, which pressurizes the refrigerant into high pressure high temperature vapor form, repeating the process.

In such systems, the manifold block may be coupled to the condenser manifold via a clasp that is physically part of the manifold block. When the manifold block is coupled to the condenser, the clasp is typically soldered or brazed to the condenser. However, it is relatively inefficient for the fitting clasp to be a physical molded part of the manifold block, because if the fitting clasp is damaged or bent in any way before being soldered or coupled in any way to the condenser, the entire manifold block may be unusable. Also, the fitting clasp is susceptible to breakage after soldering, because it is only soldered/brazed to the condenser manifold at certain points. In other words, only a portion of the surface of the fitting clasp is soldered/brazed to the condenser manifold. Moreover, traditional fitting clasps are typically much shorter than the length of the manifold block and therefore may break if the manifold block is subjected to a twisting force. If traditional fitting clasps are to be intentionally designed with longer clasps, piece of metal from which the block is extruded or machined from needs to be made larger, thus increasing the overall material and process cost.

Some systems also solder or braze the fitting clasps onto the manifold block. Such systems require a direct connection between the manifold block and the condenser body, allowing flow of fluid between the manifold block and the condenser. This type of system requires an additional solder or braze process to complete the connection between the block and the condenser. In such systems, either the solder or the braze material is typically manually placed onto specific points of the clasps, and then heated up, forming a connection between the clasps and the manifold block, and between the clasps and the condenser manifold. However, such use of solder or braze material can be problematic, because solder or brazing material in ring or paste form, is typically on the manifold block and the condenser manifold, or the clasps; before being heated. Such solder/braze material may be knocked off before heating, or an operator may simply forget to include them. Consequently, the bond between the clasps and the manifold block, or between the clasp and the condenser, is weakened. Furthermore, parts are susceptible to move during soldering or brazing, leading to higher defect rates.

Systems in the art use a manifold block that is formed of a single piece of material. However, if either of an inlet or an outlet aperture in the manifold block is damaged, the entire manifold block must typically be discarded. This is true even if only one aperture or a portion of the manifold block is damaged.

DETAILED DESCRIPTION

According to an embodiment of the present invention, fitting clasps couple a manifold block to a condenser manifold. The fitting clasps are coupled to both the manifold block and the condenser manifold by an aluminum clad material having a melting temperature below that of the material forming the manifold block, the fitting clasps, and the condenser manifold. The fitting clasps are made from aluminum clad material, and are then placed in between the manifold block and the condenser manifold. The entire device is heated to a temperature where the clad material on the outer surface of the fitting claps melts, but the material forming the manifold block, the base material of the fitting clasps, and the condenser manifold does not. After the clad material melts, the entire device is allowed to cool. As the clad material cools, a, strong bond is formed, making a sturdy connection between the manifold block, the fitting clasps, and the condenser manifold. Such an embodiment is suitable for use within an automotive climate control system of an automobile, for example.

Figure 1:
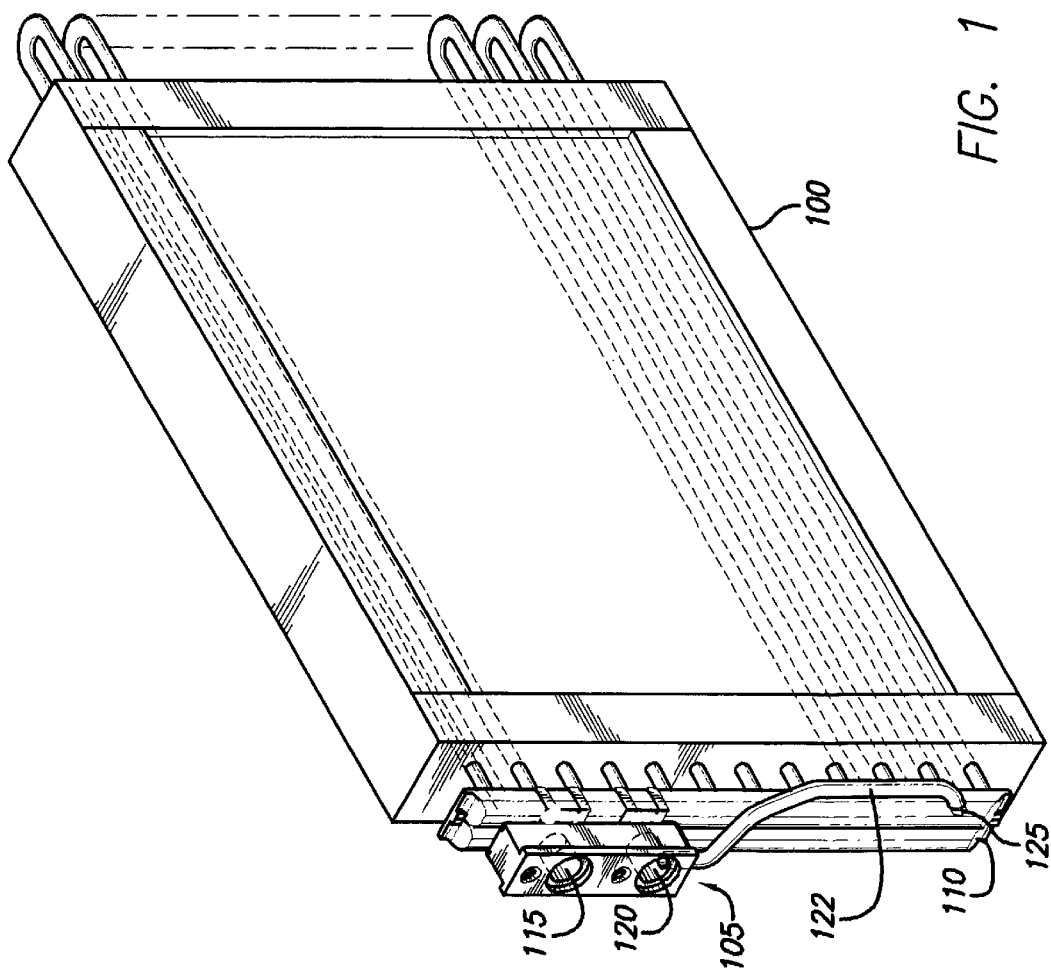
FIG. 1 shows a general overview of a manifold block coupled to a condenser of an automotive climate control system according to an embodiment of the present invention.

FIG. 1 shows a general overview of a manifold block 105 coupled to a condenser 100, or a heat exchanger, of an climate control system according to an embodiment of the present invention. In the embodiment, the automotive climate control system may serve to remove excess heat from inside the passenger cabin of an automobile. A refrigerant, such as Freon, may flow through pipes or fins of an evaporator, located inside the passenger cabin. As the refrigerant in liquid form flows through the evaporator, it absorbs heat from the passenger cabin, as it evaporates into vapor form. A compressor serves to compress the resulting refrigerant to a high temperature, high pressure form. The resulting high pressure, high temperature refrigerant vapor reaches an inlet aperture 120 of the manifold block 105. Refrigerant vapor flowing through the inlet aperture 120 enters into a pipe 122, and then into a condenser manifold 110 and the condenser 100, where it is condensed into liquid form.

The condenser 100 is comprised of a plurality of tubes or pipes through which refrigerant may circulate. The condenser 100 may also be made using "fin" like flat tubes. The tubes or pipes may be formed of a heat conductive material, such as metal. In an embodiment within an automobile, as the automobile is driven, air from outside the car comes in contact with the tubes or pipes of the condenser 100, and absorbs heat from the condenser 100 pipes, effectively cooling the refrigerant contained therein. A compressor pump pumps the refrigerant between the condenser 100 and an evaporator. Once the refrigerant within the pipes of the condenser 100 has condensed back into liquid form, it is connected to the expansion valve through the outlet aperture 115. The drop in pressure as the refrigerant passes through the expansion valves returns the refrigerant back to its low pressure, low temperature form. The refrigerant in the low pressure, low temperature form can then be returned to the evaporator, completing the cycle.

The climate control system allows the refrigerant in the climate control system to absorb the heat from the passenger cabin, as the refrigerant evaporates in the evaporator. Once the refrigerant is pumped into the condenser 100, the refrigerant flows throughout pipes or fins of the condenser 100, and radiate of "give off" heat, as heat is absorbed by air external to the automobile, effectively cooling the refrigerant contained within the condenser's 100 pipes. After the refrigerant gives off enough heat, the refrigerant condenses into liquid form. The refrigerant in liquid from can then be returned to the evaporator via the expansion valve, where the process repeats. The process serves to help keep the passenger cabin cool.

As shown in FIG. 1, when the refrigerant is received through the inlet aperture 120 of the manifold block 105, it flows through a pipe 122 to an aperture 125 at the bottom of the condenser manifold 110. The refrigerant travels upward through the pipes of the condenser 100, and condensed refrigerant in the pipes near the top of the condenser 100 is then pumped back into to the expansion valve through the outlet aperture 115. Although the embodiment shown in FIG. 1 has a manifold block 105 connected near the top of the condenser manifold 110, the manifold block 105 may be connected to the bottom of the condenser manifold 110, or in an other suitable location on the condenser manifold 110, in other embodiments. Other embodiments may also include an inlet aperture 120 located above the outlet aperture 115 on the manifold block 105

Figure 2:
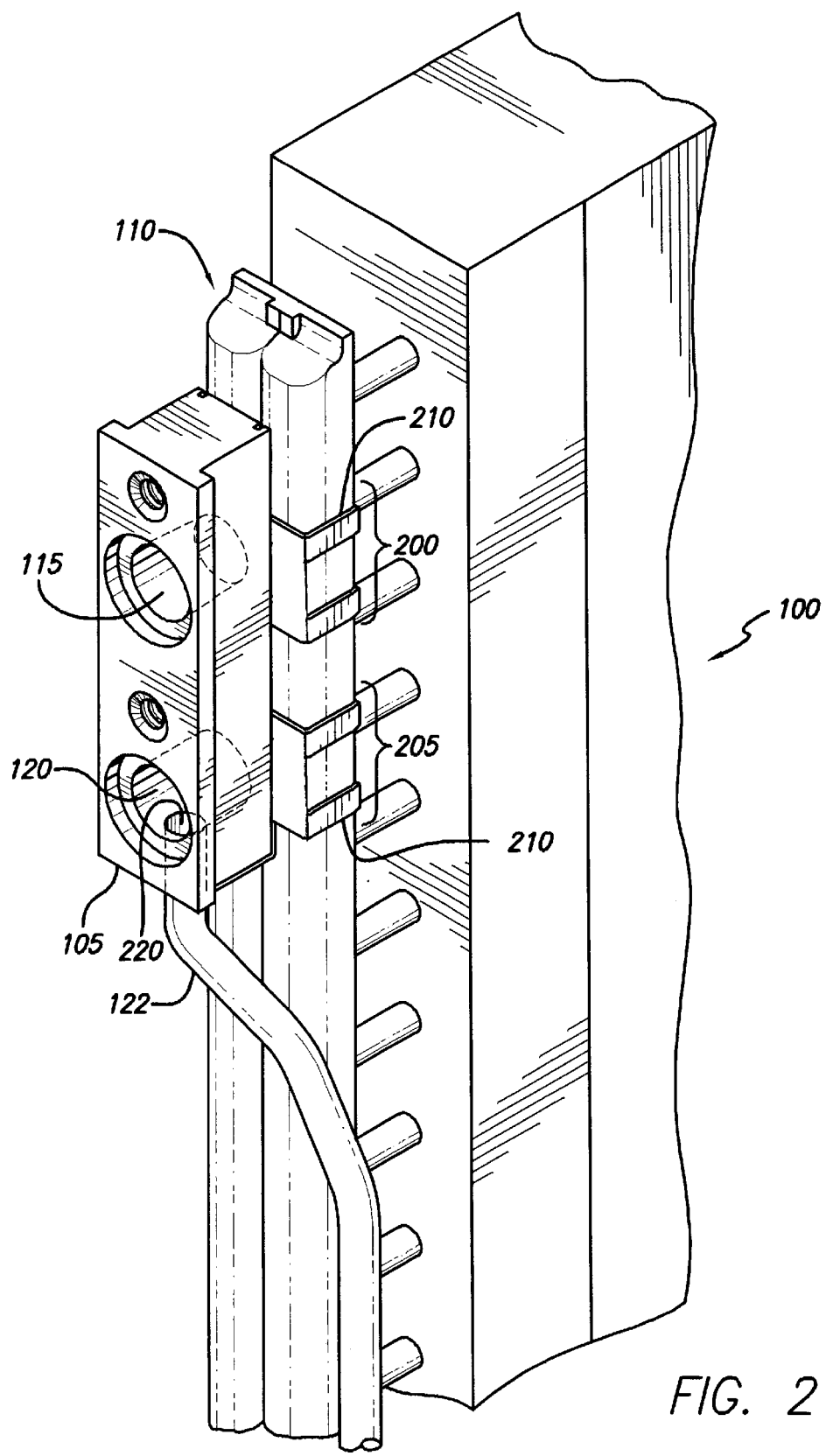
FIG. 2 illustrates a close-up view of the manifold block coupled to a condenser manifold according to an embodiment of the present invention.

FIG. 2 illustrates a close-up view of the manifold block 105 connected to the condenser manifold 110 according to an embodiment of the present invention. In the embodiment, two fitting clasps 200, 205 connect the manifold block 105 to the condenser manifold 110. The manifold block 105 is located on top of the front vertical face of the condenser manifold 110. A top fitting clasp 200 has a set of legs 210 that contact the front vertical face of the condenser manifold 110 and extend along the side vertical faces of the condenser manifold 110. As explained in further detail in the discussion of FIG. 2 below, the top fitting clasp 200 has an aperture that allows refrigerant to flow from the condenser manifold 110 through the aperture in the top fitting clasp 200, and through the outlet aperture 115 of the manifold block 105. In the embodiment shown in FIG. 2, a bottom fitting clasp 205 is coupled to the manifold block 105 and the condenser manifold 110 at a location below the top fitting clasp 200. The bottom fitting clasp 205 also has a plurality of legs 210 that serve to couple the manifold block 105 to the condenser manifold 110. The manifold block 105 has an aperture 220, which allows liquid to flow from the inlet aperture 120 to the pipe 122, and ultimately into the condenser manifold 110.

The legs 210 of the top 200,and bottom 205 clasps fit tightly around the front vertical face and side vertical faces of the condenser manifold 110 and serve to prevent slippage between the manifold block 105 and the condenser manifold 110. Connected to a hole 220 on the bottom side of the manifold block 105 is a pipe 122 that extends to an aperture 125 near the bottom of the condenser manifold 110 (see FIG. 1). The metal pipe 122 is utilized to allow refrigerant to flow to the bottom of the condenser 100. In an embodiment of the invention, refrigerant from the compressor enters the manifold block 105 through the inlet aperture 120. Once inside the manifold block 105, the refrigerant flows down the metal pipe 122 to the aperture 125 at the bottom of the condenser manifold 110. The pipe 122 may be formed of metal, or of any other suitable material.

The outlet aperture 115 allows refrigerant to flow from the condenser 100 to the expansion valve. When an automobile or other device utilizing this system is in operation, heated refrigerant gas may flow into the condenser 100 through the inlet aperture 120 and flow throughout the condenser 100 while outside air absorbs heat from the refrigerant. After the refrigerant has flowed through the condenser 100, the condensed refrigerant may exit the condenser 100 and return to the evaporator via the expansion valve through the outlet aperture 115.

The top 200 and bottom 205 clasps serve to prevent slippage between the manifold block 105 and the condenser manifold 110. Although only top 200 and bottom 205 clasps are illustrated in FIG. 2, other embodiments may use more or fewer than two clasps. In the embodiment shown in FIG. 2, each clasp has four "legs" 210, or metal extensions extending in a direction perpendicular to front face of the clasp. In an embodiment having four legs 210 on each clasp, two legs 210 extend on each side of the clasp, with a space between each leg 210 on each side. Other embodiments may use more or less than four legs 210.

Figure 3:
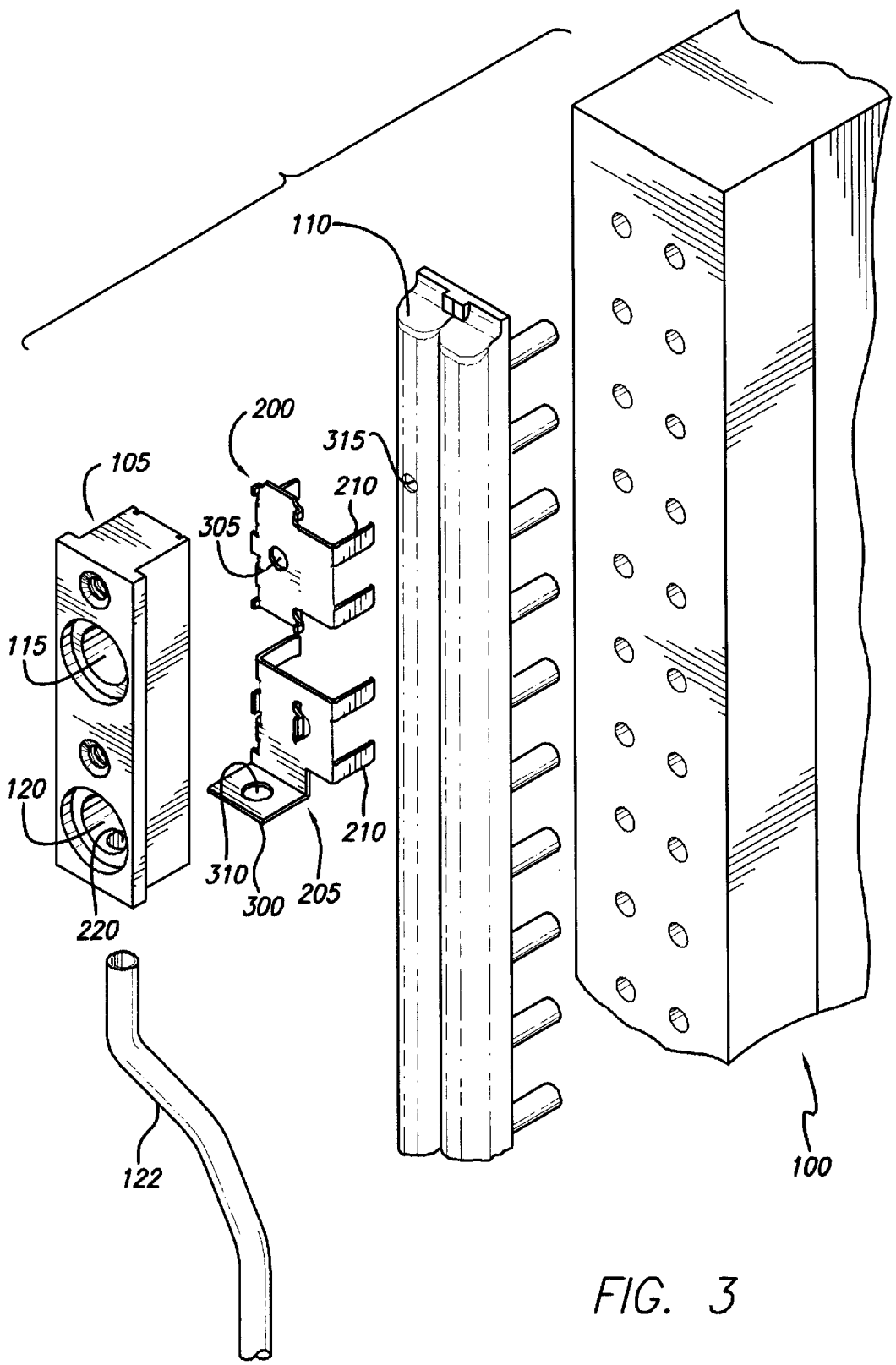
FIG. 3 illustrates an exploded close-up view of the manifold block, the fitting clasps, the condenser manifold and a pipe connected to the manifold block according to an embodiment of the present invention.

FIG. 3 illustrates an exploded close-up view of the manifold block 105, the top and bottom fitting clasps 200 and 205, the condenser manifold 110 and the pipe 122 connected to the manifold block 105 according to an embodiment of the present invention. The top fitting clasp 200 has a connection aperture 305 through which refrigerant may pass when the top fitting clasp 200 is coupled to the condenser manifold 110 and the manifold block 105. The condenser manifold 110 also has an aperture 315 near its top through which the refrigerant may flow. The refrigerant flows out of the aperture 315 in the top of the condenser manifold 110, through the connection aperture 305, and into the evaporator after passing through the outlet aperture 115.

In an embodiment of the present invention, the top fitting clasp 200 and the bottom fitting clasp 205 are made from aluminum clad material, and the manifold block 105 and the condenser manifold 110 are formed of an aluminum alloy having a melting temperature higher than that of the clad material on the outer surface of the aluminum clad material. In the embodiment, the melting point of the aluminum alloy may be 100 degrees higher than that of the aluminum clad material, for example. The top 200 and bottom 205 fitting clasps are placed underneath the manifold block 105, and on top of the condenser manifold 110. The top fitting clasp 200 is positioned so that connection aperture 305 lines up with the aperture 315 on the top of the condenser manifold 110 and with outlet aperture 115 on manifold block 105. The manifold block 105, the top 200 and bottom 205 fitting clasps, and the condenser manifold 110 are then all heated to a temperature greater than the melting point of the aluminum clad material, but below that of the aluminum alloy forming the core of the top 200 and bottom 205 fitting clasps, manifold block 105, and the condenser manifold 110. The aluminum clad material melts, and then the condenser manifold 110, the top 200 and bottom 205 fitting clasps, and the manifold block 105 are allowed to cool. As they cool, the aluminum clad material solidifies and forms a strong bond between the top 200 and bottom 205 fitting clasps, the condenser manifold 110, and the manifold block 105. In other embodiments, suitable materials other than aluminum or the aluminum clad material may be utilized.

FIG. 3 also illustrates the bottom fitting clasp 205. In the illustrated embodiment, the bottom fitting clasp 205 has four legs 210. Other embodiments may use more or fewer than tour legs 210. The bottom fitting clasp 205 has an vertical face 300 that extends in a direction perpendicular to the front face of the bottom fitting clasp 205, away from the legs 210. The vertical face 300 has an aperture 310 located around its center. The pipe 122 connects to the aperture 220 through the aperture 310 on the vertical face 300 of the bottom fitting clasp 205. When the bottom fitting clasp 205 is correctly positioned, the vertical face 300 is bonded to the bottom face of the manifold block 105 via the clad material. When bonded, the vertical face 300 serves to prevent the manifold block 105 from rotating in an angular direction. In other embodiments, the vertical face may not be necessary based on the requirements of the application.

When in place, each leg 210 of the top 200 and bottom 205 clasps wrap onto a side of the condenser manifold 110. When the legs 210 have been coupled to the condenser manifold 110, they serve to prevent the manifold block 105 from rotating when subjected to an angular force or torque. This is necessary because the metal pipe 122 extending to the bottom of the condenser manifold 110 may break or become dislodged if the manifold block 105 were to rotate in such a direction. The connection aperture 305 allows liquid to flow between the condenser manifold 110 and the manifold block 105 when the top fitting clasp 200 is coupled to the manifold block 105 and the condenser manifold 110.

Figure 4:
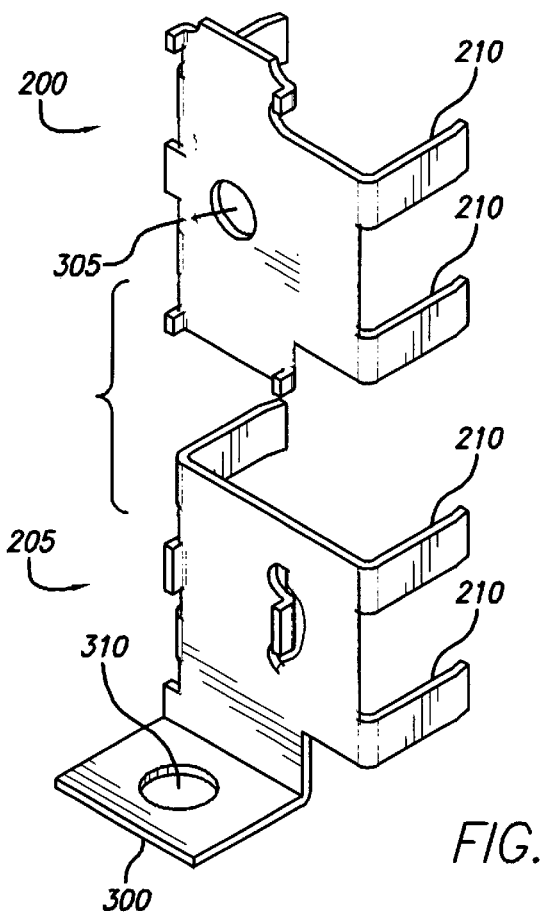
FIG. 4 illustrates a close-up view of top and bottom fitting clasps according to an embodiment of the present invention.

FIG. 4 illustrates a close-up view of top 200 and bottom 205 fitting clasps according to an embodiment of the present invention. The aluminum clad material is used to form the material surrounding the connection aperture 305 before the manifold block 105 is positioned on top of it. During the heating process, the aluminum clad material on material surrounding the connection aperture 305 melts, and is later cooled, forming a strong bond with the structure of the manifold block 105 having the outlet aperture 115.

Figure 5:
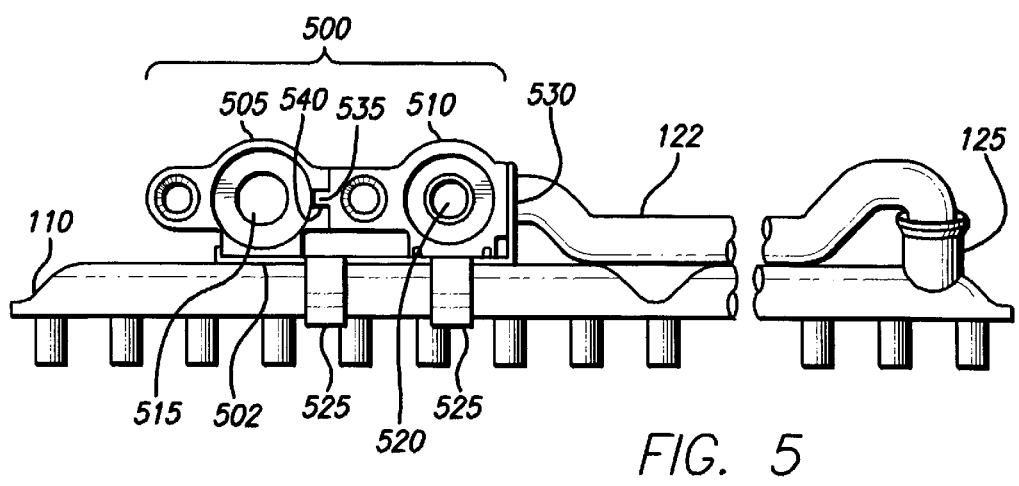
FIG. 5 illustrates a close-up view of a second manifold block connected, via a fitting clasp, to a condenser manifold according to an embodiment of the present invention.

FIG. 5 illustrates a close-up view of a second manifold block 500 connected via a fitting clasp 502, to a condenser manifold 110 according to an embodiment of the present invention. The second manifold block 502 includes an outlet block 505 containing the outlet aperture 515 and an inlet block 510 containing the inlet aperture 520. The outlet block 505 is coupled to the inlet block 510 by a notch 535 on the inlet block 510, which fits into a groove 540 on the outlet block 505. The second manifold block 500 is coupled to the fitting clasp 502. The fitting clasp 502 has legs 525 that wrap around the vertical sides of the condenser manifold 110. The fitting clasp 502 contains a vertical face 530 extending in a direction perpendicular to the top face of the fitting clasp, in a direction away from the legs 525 thereof The vertical face 530 has an aperture through which a pipe 122 extends. In other embodiments, the vertical face may not be necessary based on the requirements of the application. On its other end, the pipe 122 connects to an aperture 125 at the bottom of the condenser manifold 110. When in place, refrigerant may enter the inlet aperture 520 of the second manifold block 500, and then pass through the pipe 122 and into the condenser manifold 110 through the aperture 125 at the bottom of the condenser manifold 110.

Figure 6:
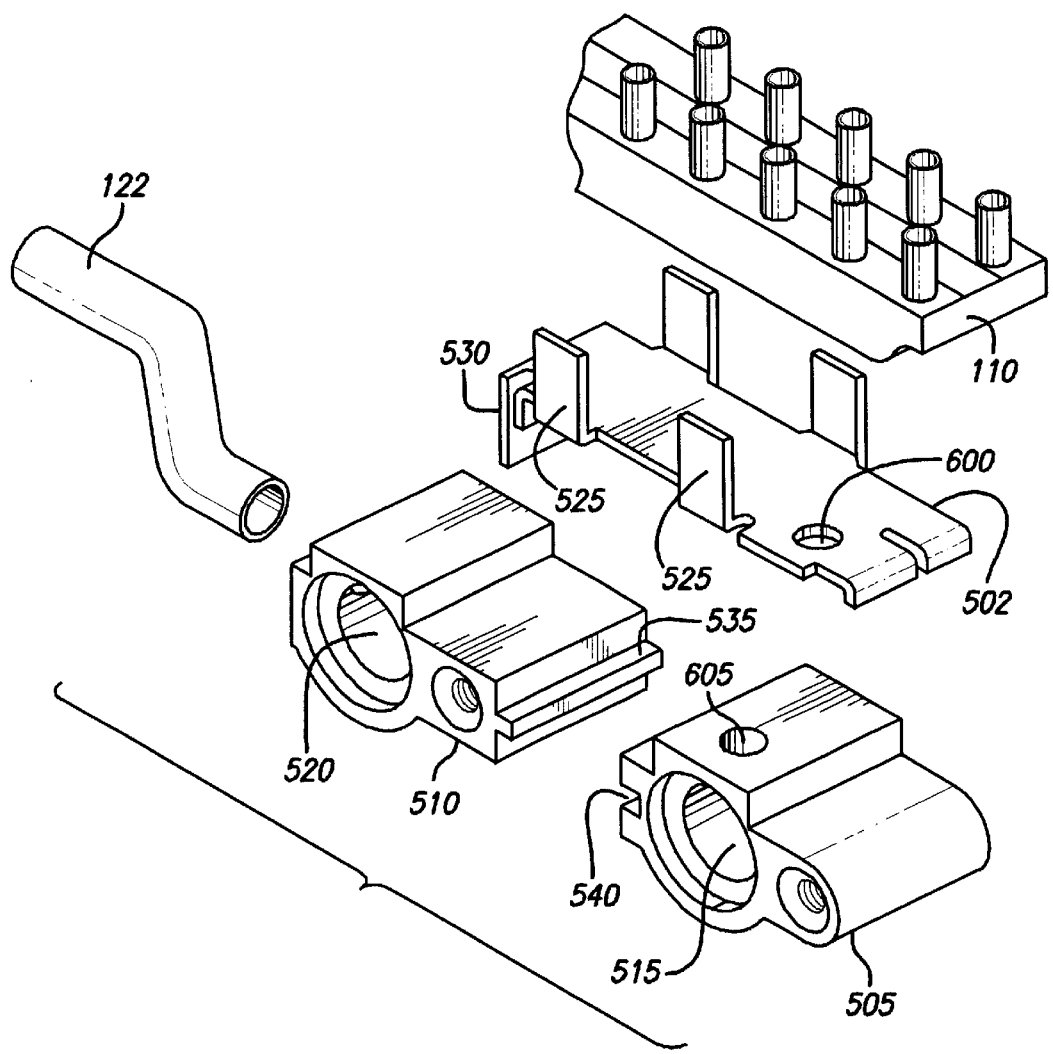
FIG. 6 illustrates a close-up exploded view of the second manifold block, the condenser, manifold, the fitting clasp, and the pipe connected to the second manifold block according to an embodiment of the present invention.

FIG. 6 illustrates a close-up exploded view of the second manifold block 500, the condenser manifold 110, the fitting clasp 502, and the pipe 122 connected to the second manifold block 500 according to an embodiment of the present invention. The fitting clasp 502 contains a connection aperture 600. The outlet block 505 contains an aperture 605 through which refrigerant from the condenser manifold 110 may flow. When the outlet block 505 is positioned on top of the fitting clasp 502, the connection aperture 600 fits underneath the aperture 605 on the top of the outlet block 505.

Figure 7:
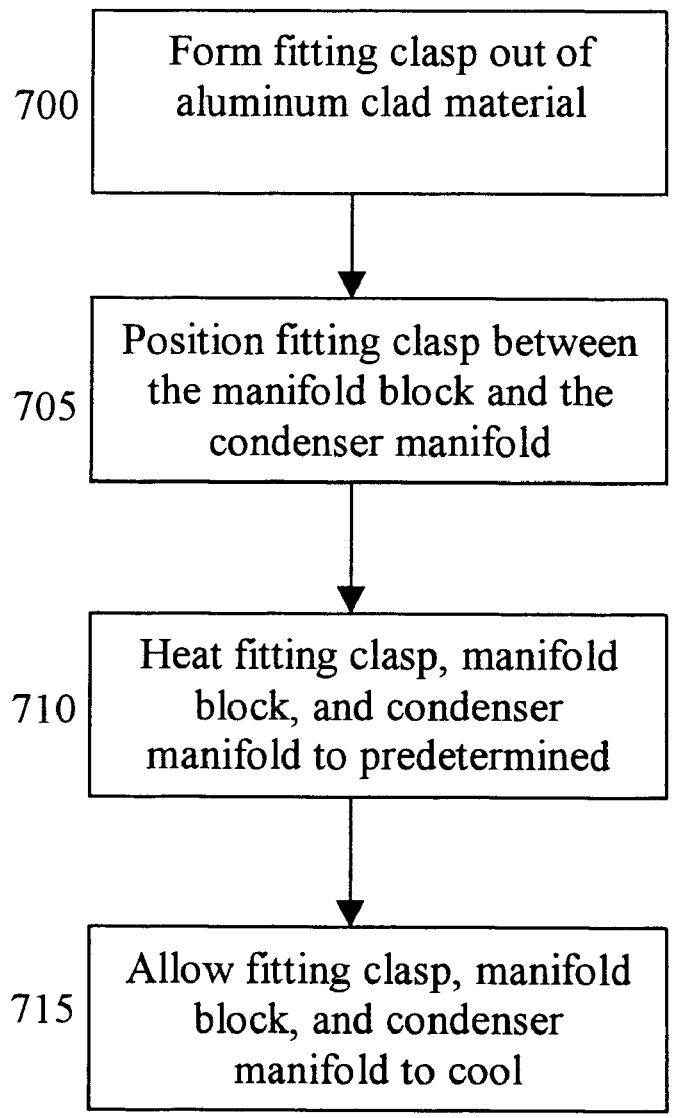
FIG. 7 illustrates the process by which the fitting clasp is coupled to the condenser manifold and the manifold block according to an embodiment of the present invention.

FIG. 7 illustrates the process by which the fitting clasp 502 is coupled to the condenser manifold 110 and the manifold block 500 according to an embodiment of the present invention. First, the fitting clasp 502 is formed 700 from aluminum 700 clad material. In other embodiments, clad material other than aluminum may be utilized.

In a situation where the condenser manifold 110, the manifold block 500, and the fitting clasp 502 are all formed of an aluminum clad material, the cladding material on the outer surfaces may have a melting point one hundred degrees below that of the core of the aluminum alloy, for example. In other embodiments, the manifold block 105 and the condenser manifold 110 may also be formed from the aluminum clad material. At step 705, the fitting clasp 502 is positioned between the manifold block 500 and the condenser manifold 110. Next, the combination of the fitting clasp 502, the manifold block 500, and the condenser manifold 110 is heated 710 to a predetermined temperature. The predetermined temperature is typically above the melting point of the clad material, but below that of the core aluminum alloy. Finally, the entire assembly is allowed to cool 715. As the assembly cools, the clad material solidifies, forming a strong bond between the condenser manifold 110 and the fitting clasp 502, and between the manifold block 500 and the fitting clasp 502.

The outlet block 505 and the inlet block 510 may be manufactured separately. This can result in cost savings because if the inlet aperture 520 is deformed, for example, a new inlet block 510 need only be manufactured to replace the deformed part, rather than an entirely new manifold block 500. Additional cost savings is possible if the blocks made separately features a shape or a profile that is very different from each other as it will decrease the need to remove excess aluminum material to form the net part. This may result in savings in processing as well as materials cost.

While the description above refers to particular embodiments of the present invention, it will be understood that many modifications may be made without departing from the spirit thereof The accompanying claims are intended to cover such modifications as would fall within the true scope and spirit of the present invention. The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. An automobile climate control system, comprising:
   a coolant dispersing device to allow coolant to flow;
   heat exchanger to cool the coolant;
   a manifold block to allow the coolant to transfer between the liquid dispersing device and the heat exchanger, wherein the manifold block is in communication with the heat exchanger and the coolant dispersing device; and
   at least one separately formed clasp, rigidly mounted to the manifold block, wherein the at least one separately formed clasp has separate extension members to rigidly mount the at least one separately formed clasp to the heat exchanger, and the clasp is rigidly mounted using a clad material to form a connection between the extension members and the heat exchanger.

2. The system according to claim 1, wherein the clad material couples the manifold block to the at least one clasp.

3. The system according to claim 1, wherein the clad material is formed of an aluminum alloy.

4. The system according to claim 1, wherein the at least one clasp has a substantially flat surface, and the extension members extend in a direction away from the flat surface of at least one clasp.

5. The system according to claim 4, wherein the flat surface is coupled by the clad material to an outside edge of a manifold of the heat exchanger, and the extension members are coupled by the clad material to sides of the manifold of the heat exchanger extending in a direction perpendicular to the flat surface.

6. The system according to claim 1, wherein the coolant is at least one of a liquid and a gas.

7. A method of coupling at least one fitting clasp to each of a manifold block and a heat exchanger, comprising:
   using at least one fitting clasp formed from a clad material;
   placing the at least one fitting clasp on a top of the heat exchanger and the manifold block on a top of the at least one fitting clasp;
   heating a combination of the at least one fitting clasp, the heat exchanger, and the manifold block to a predetermined temperature; and
   allowing the combination of the at least one fitting clasp, the heat exchanger, and the manifold block to cool.

8. The method according to claim 7, wherein the at least one fitting clasp includes two fitting clasps.

9. The method according to claim 7, wherein the clad material is formed of an aluminum alloy.

10. The method according to claim 7, wherein the at least one clasp is coupled to a manifold on the heat exchanger.

11. The method according to claim 7, wherein the clad material on the outer-layer of the fitting clasp has a melting point below that of at least one material forming a core of the fitting clasp, a core of the heat exchanger, and a core of the manifold block.

12. An apparatus for securing a manifold block to a heat exchanger, comprising:
   a top surface to which the manifold block is coupled;
   a bottom surface to which the heat exchanger is coupled;
   a plurality of legs, the legs extending away from the bottom surface, wherein the legs are coupled to the heat exchanger, wherein a coupling between the legs and the heat exchanger is done using a clad material to form a connection between the legs and the heat exchanger.

13. The apparatus according to claim 12, wherein the bottom surface is coupled to the heat exchanger by the clad material.

14. The apparatus according to claim 12, wherein the top surface is coupled to the manifold block by the clad material.

15. The apparatus according to claim 12, wherein the apparatus has an aperture extending through the top and bottom surfaces, and through which a first aperture in the manifold block is connected to an aperture in the heat exchanger.

16. A manifold block to transfer coolant between a liquid dispersing device and a heat exchanger, comprising:
   an inlet block having an inlet aperture to receive coolant;
   an outlet block having an outlet aperture to output the liquid, wherein the outlet block receives the liquid from the heat exchanger, and the inlet block and the outlet block are coupled together using a clad material to form a connection between the inlet block and the outlet block.

17. The manifold block according to claim 16, wherein the inlet block has a side notch, and the outlet block has a side groove, and the side notch fits in the side groove.

18. The manifold block according to claim 17, wherein the side groove and the side notch are coupled by the clad material.

19. The manifold block according to claim 18, wherein the clad material is an aluminum alloy.

20. The manifold block according to claim 16, wherein the coolant is at least one of a liquid and a gas.

* * * * *